Oct. 6, 1964 P. C. TEMPLE 3,151,718
HYDRAULIC CONTROL
Filed Sept. 26, 1961 3 Sheets-Sheet 2

Inventor
Paul C. Temple
By Charles L. Schwab
Attorney

Inventor
Paul C. Temple
By Charles L. Schuck
Attorney

United States Patent Office 3,151,718
Patented Oct. 6, 1964

3,151,718
HYDRAULIC CONTROL
Paul C. Temple, Springfield, Ill., assignor to Allis-Chalmers Manufacturing Company, Milwaukee, Wis.
Filed Sept. 26, 1961, Ser. No. 140,759
2 Claims. (Cl. 192—3.2)

This invention relates to a hydraulic control providing a plurality of hydraulic pressure levels for use in supplying mechanism requiring hydraulic fluid. More particularly, this invention relates to a hydraulic control wherein a hydraulic valve assembly includes a plurality of pressure chambers and pressure control valves to regulate the pressure level within such chambers.

It is an object of this invention to provide a control valve assembly wherein the housing for a shiftable valve member includes a plurality of pressure chambers and pressure control valves associated with the chambers to maintain different pressures in the various chambers.

It is a further object of this invention to provide a control system for a pair of hydraulically actuated friction clutches wherein a pair of pressure chambers are incorporated in a valve housing with pressure control valves to maintain at least two different pressure levels, and these two pressure levels are selectively placed in communication with the pair of friction clutches by a shiftable valve member.

It is a further object of this invention to provide a hydraulic control system for a torque converter and a transmission of the type having a pair of hydraulically actuated friction clutches wherein a valve housing of the control system includes high, intermediate and low pressure chambers with the high and low pressure chambers being selectively connected to the hydraulically actuated clutches through a shiftable valve member and with the intermediate pressure chamber in fluid supplying relation to the torque converter.

It is a further object of this invention to provide a hydraulic control for a torque converter and transmission which provides two levels of fluid pressure for operating transmission clutches and a third level of fluid pressure for supplying fluid to the torque converter.

It is a further object of this invention to provide a control valve which is compact, is relatively inexpensive to manufacture and gives long trouble free service.

These and other objects of this invention will be apparent to those familiar with the art when the following description is read in conjunction with the drawings in which.

Figure 1:
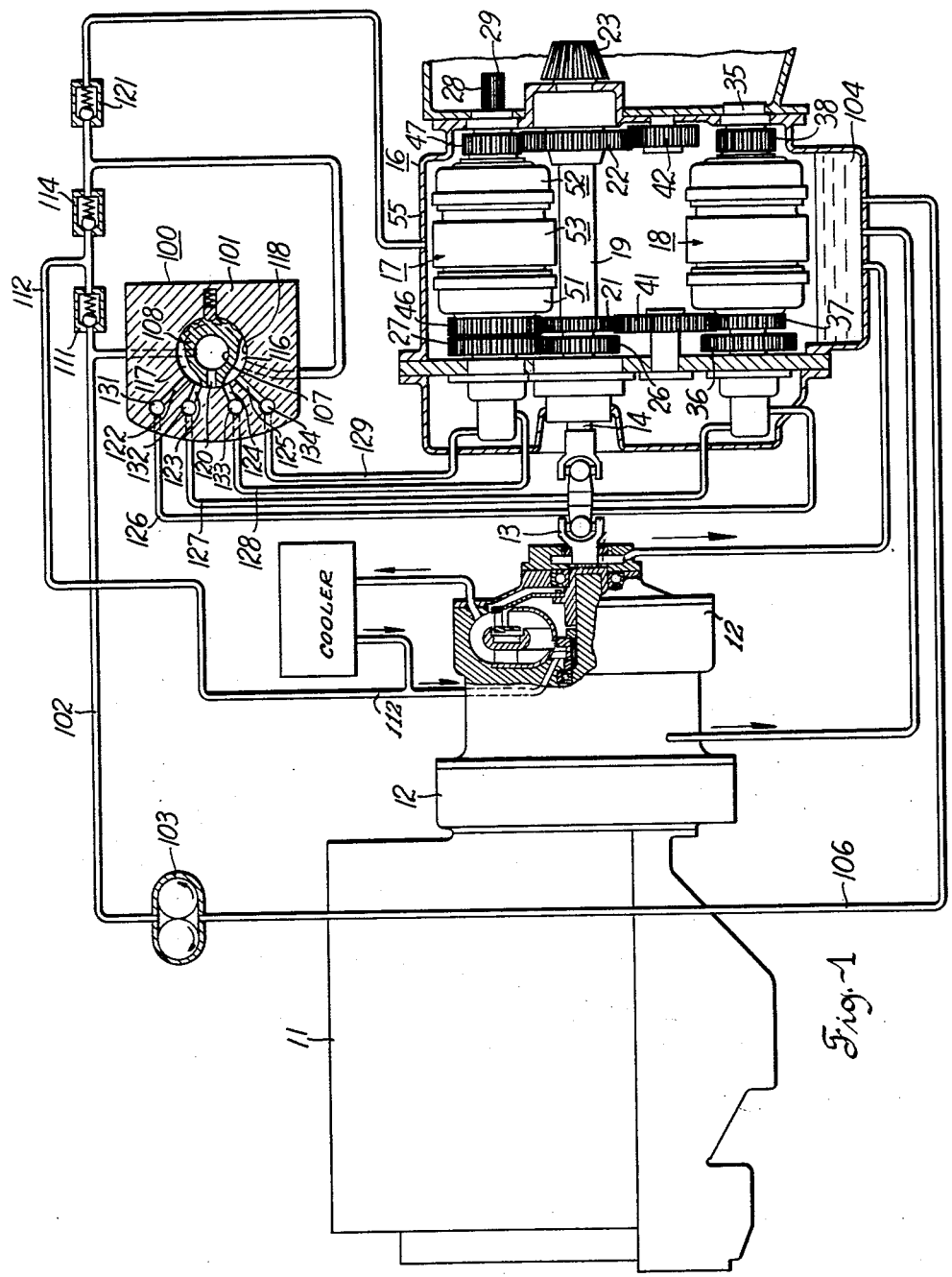
FIG. 1 is a schematic showing of an engine, torque converter and transmission and the hydraulic control of this invention.

Referring to FIG. 1, an engine 11 drives a torque converter 12 and the output shaft 13 of the torque converter is connected through a pair of universal joints to the input shaft 14 of a transmission 16. The transmission 16 includes two pair of hydraulically actuated clutch assemblies 17, 18 for selecting forward and reverse speed ratios. An output shaft 19 has a pair of gears 21, 22 fixedly connected thereto and carries a bevel gear pinion 23 for driving a power train connected to the traction means, not shown, of a vehicle in which the engine, torque converter and transmission may be installed. Gear 26 is fixedly connected to the input shaft 14 and meshes with a gear 27 which is secured for rotation with a transmission shaft 28, the latter having a splined extension 29 suitable for driving power take-off driven mechanism. Gear 26 of the input shaft meshes with gear 36 secured to a second transmission shaft 35 and gears 37, 38 are mounted on the second transmission shaft 35 by a pair of bearings, not shown. Idle gear 41 is operatively interposed between gears 21 and 37 and idler gear 42 meshes with gears 22 and 38. Gears 46, 47 are rotatably mounted on transmission shaft 28 and are selectively secured to rotate with transmission shaft 28 by clutch assembly 17 which includes friction clutches 51, 52 at opposite sides of a hydraulic double acting actuator 53. It will be noted that in FIG. 2, gear 26 does not appear to mesh with gear 36 and gear 42 does not appear to mesh with gear 38. This is due to the view being developed on planes through the axes of gears 46, 21, 41 and 37.

Figure 2:
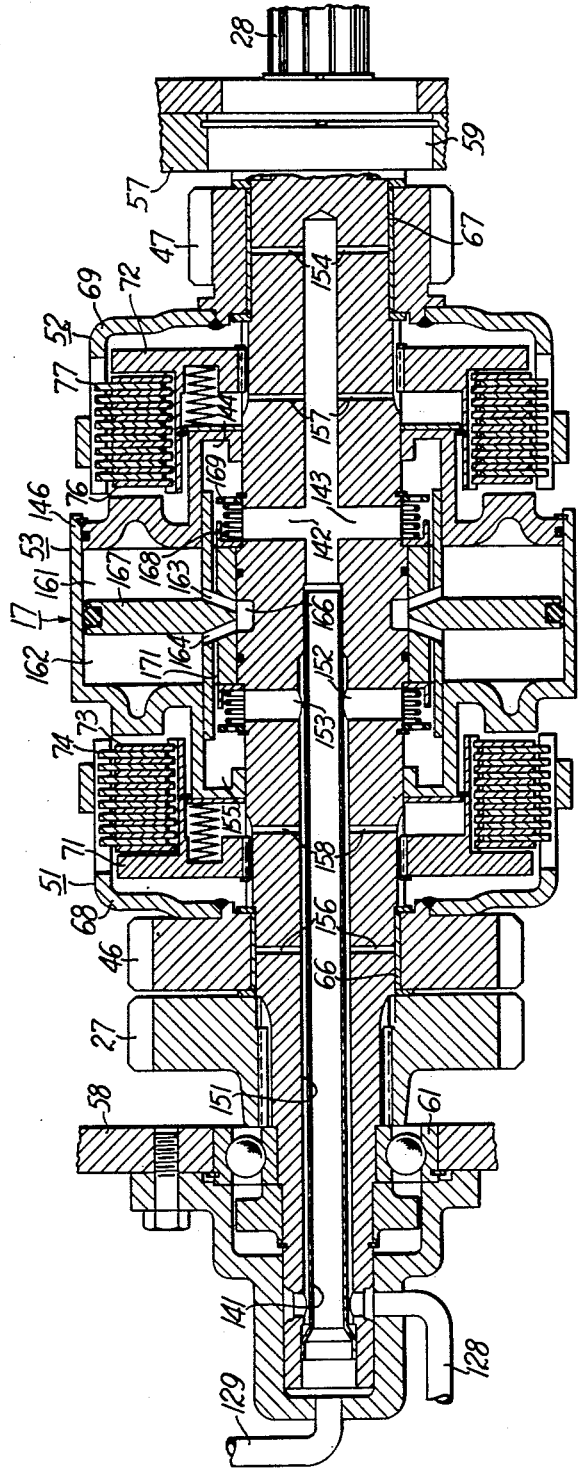
FIG. 2 is a section through the center line of one shaft of the transmission.

Referring also to FIG. 2, the transmission shaft 28 is carried in the walls 57, 58 of the transmission housing 55 by bearings 59, 61. Gear 27 has a splined connection with shaft 28 and gears 46, 47 are rotatably carried on the shaft by a pair of sleeve bearings 66. 67. Clutch 51 of clutch assembly 17 includes an outer drum 68 which is welded to gear 46, an inner drum 71 splined to the shaft 28 and friction disks 73, 74 carried by drums 68, 71 respectively. Clutch 52 likewise includes an outer drum 69, an inner drum 72 and friction disks 76, 77. Clutch assembly 17 also includes a double acting hydraulic actuator 53 which is interposed between the transmission shaft 28 and the friction clutch multiple disk packs made up of the sets of disks 73, 74 and 76, 77.

Referring again to FIG. 1, the hydraulic valve assembly 100 includes a housing 101 which receives fluid through a supply conduit 102 from a pump 103 propelled by the engine through means, not shown. The pump draws fluid from the reservoir 104 at the bottom of the transmission housing 55 through a conduit 106. Fluid from the pump 103 is delivered to a pocket 107 of a shiftable valve member 108. The pressure in the chamber communicating with the pocket 107 is maintained at approximately 150 p.s.i. through a pressure relief valve 111 which is actually built into the valve housing 101. Excess fluid is discharged through pressure relief valve 111 into a torque converter supply conduit 112 and pressure is maintained in the conduit at approximately 50 p.s.i. by a second pressure relief valve 114. Excess fluid passing through the second pressure relief valve 114 flows to an intermediate pressure chamber within the valve housing which includes interconnected chambers 116, 117 between the valve member 108 and a bore 118 in which valve member 108 is rotatably mounted. Pressure will be maintained in the chambers 117, 116 at approximately 8 p.s.i. by a third pressure relief valve 121. Excess fluid passing through the third pressure relief valve 121 is dumped into the transmission housing 55.

A pressure supply port 120 extends between the pocket 107 of the shiftable valve member 108 and the latter's cylindrical surface. When the rotatable valve member 108 is shifted, from its neutral position in which illustrated in FIG. 1, to a position wherein port 120 registers with one of the clutch supply passages 122, 123, 124 or 125, the hydraulic clutch associated therewith will be actuated by the 150 p.s.i. pressure and the other hydraulic clutches will be in fluid communication with the chambers 116, 117 which are maintained at 8 p.s.i. Clutch supply passages 122, 123, 124 and 125 are connected to clutch supply conduits 126, 127, 128, 129, respectively, through clutch supply outlet passages 131, 132, 133 and 134.

Referring also to FIG. 2, conduit 129 is connected to an interior passage 141 which in turn is connected to branch passages 142, 143 extending to an inner chamber 144 at the right side of cylinder 146 of double acting actuator 53. Clutch supply conduit 128 is connected to a passage 151 within the transmission shaft 28 which extends to branch passages 152, 153 which supply fluid to an inner chamber 155 at the left side of cylinder 146. Small lubrication passages 154 and 156 extend between clutch supply passages 141 and 151 and bearings 67 and 66 respectively. Thus the hydraulic pressure fluid used to operate the hydraulic actuator for the clutches also serves to lubricate the sleeve type bearings 66, 67 of gears 46, 47. Passages 157, 158 lead from clutch supply passages 141 and 151 to the exterior of shaft 28 and are effective to deliver oil to the clutch disks 73, 74, 76, 77 to cool them in a conventional usual manner. It should be understood that the passages 154, 156, 157 and 158 are small enough to serve as restrictions to flow of the pressure fluid yet permit sufficient flow to achieve the desired lubrication and cooling functions.

When the shiftable valve member 108 is rotated counterclockwise, as viewed in FIG. 1, until port 120 is aligned with passage 124, hydraulic pressure fluid at 150 p.s.i. is delivered through conduit 128 to passages 152, 153 thence to the inner clutch actuator chamber 155 and the cylinder 146 will be moved to the left until the clutch 51 is engaged. During this initial movement fluid from outer chamber 161 will transfer to outer chamber 162 through passages 163, 164 and annular groove 166. Upon the pressure building up in chamber 155 as the disks 73, 74 are engaged by the cylinder 146, the reaction member 167 will be moved to the right until stop 168 engages abutment washer 169. At this position of axial displacement, passage 163 will be closed thereby preventing further fluid transfer between chamber 161 and 162. Pressure fluid from 155 will flow through a bleed passage 171 to passage 164 and thence into outer chamber 162 to place it under pressure of 150 p.s.i. Thus the disks 73, 74 of clutch 51 will be fully engaged by the actuator 53. The fluid passing through passages 156 and 158 will not be sufficient in quantity to materially affect the pressure. When the hydraulically actuated clutch for gear 46 is thus engaged, the gear 46 and shaft 28 are connected in power transmitting relation to one another thereby establishing a high forward speed. Passages 129 and 141 are connected to the 8 p.s.i. chambers 116, 117 and are thus maintained full of fluid. Likewise, chambers 144 and 161 are maintained full of 8 p.s.i. fluid. Thus it is seen that when the supply passage 102 is placed in communication with conduit 128, a pair of coaxial relative rotatable members in the form of gear 46 and shaft 28 are connected for rotation with one another. If the valve member 108 is rotated to place conduit 129 in fluid communication with conduit 102, thereby subjecting pressure chamber 144 to 150 p.s.i., the clutch actuator 146 will cause engagement of clutch 52 thereby connecting gear 47 to the shaft 28. When both conduits 128 and 129 are connected to the 8 p.s.i. pressure of chamber 116, the clutch actuator 53 will remain in a neutral position in which it is illustrated in FIG. 2.

Figure 4:
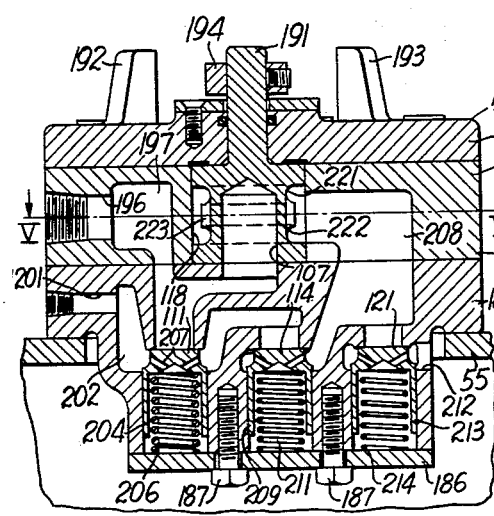
FIG. 4 is a section taken along the lines IV—IV in FIG. 3.
Figure 3:
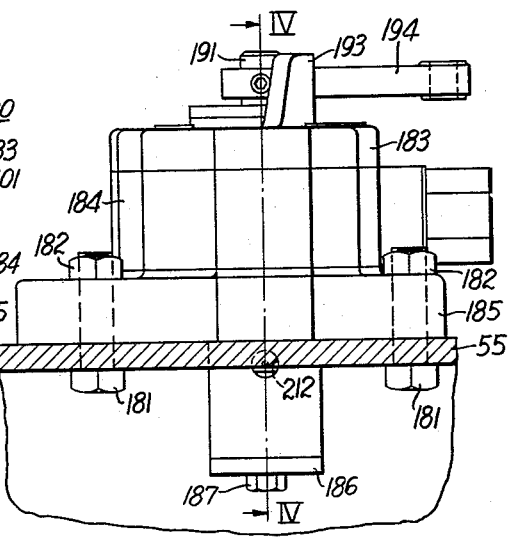
FIG. 3 is a side view of the control valve assembly attached to the transmission housing.

Referring to FIGS. 3 and 4, the valve assembly 100 includes a housing 101 which is secured to the transmission housing 55 by a plurality of bolts 181 and nuts 182. The valve housing 101 includes a top section 183, an intermediate section 184 and a bottom section 185, to which is secured a cap 186 by screws 187. As previously mentioned, the valve member 108 is rotatably mounted in a bore 118 in intermediate section 184 of the valve housing 101. The valve member 108 includes a stem portion 191 to which a control lever 194 is attached to rotate the valve member. Stops 192, 193 are provided on the top section 183 to limit the rotational movement of the control lever 194. Conduit 102 is connected to an inlet passage 196 which communicates with a high pressure chamber 197 within the housing. The high pressure chamber 197 communicates with pocket 107 within the valve member 108. A pressure fluid supply port 201 is provided in the lower section 185 of the valve housing 101 and this port is connected to the torque converter through conduit 112 and is also in communication with an intermediate pressure chamber 202 within the valve housing.

The high pressure differential valve 111 provided within the valve housing between the high pressure chamber 197 and the intermediate pressure chamber 202 includes a piston 204 which is biased to a closed position by a coil spring 206. The bottom side of the piston 204 is placed in fluid communication with the intermediate pressure chamber by passages 207. Relieved portions of the valve member 108, which define chambers 116, 117, are in fluid communication with the low pressure chamber 208 within the valve housing. An intermediate pressure relief valve 114 is provided between pressure chamber 202 and pressure chamber 208 and includes a valve piston 209. Valve 114 is similar in construction to differential valve 111 except its biasing spring 211 is weaker than the spring 206 of relief valve 111. An outlet passage 212 is provided in the lower section 185 of the valve housing 101 and a differential relief valve 121 is provided between the low pressure chamber 208 and the outlet passage 212. The relief valve 121 includes a piston 213 and is similar in construction to relief valve 209 except that its biasing spring 214 is weaker than coil spring 211. The outlet passage 212 permits fluid escaping from chamber 208 through relief valve 121 to pass to the interior of the transmission housing 55 and thus to the reservoir 104 at the bottom thereof. As is customary, the interior of the transmisison housing is maintained at approximately zero pressure through use of a breather, not shown. The differential relief valve 121 is effective to maintain the pressure in low pressure chamber 208 at a predetermined value such as 8 p.s.i. The differential pressure relief valve 114 is effective to maintain the pressure in chamber 202 at a second predetermined value such as 50 p.s.i., and differential relief valve 111 is effective to maintain the pressure in chamber 197 at some higher pressure such as 150 p.s.i.

Figure 5:
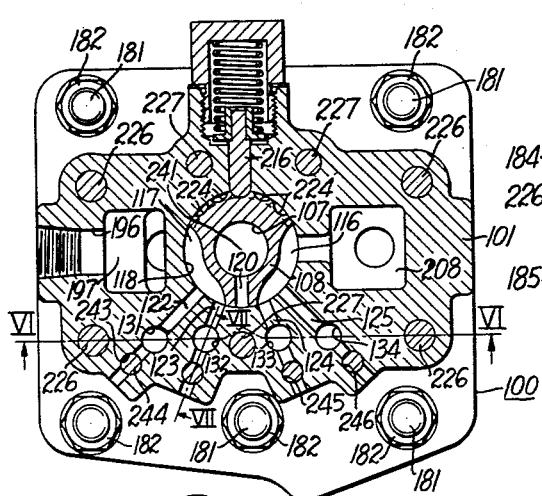
FIG. 5 is a section taken along the lines V—V of FIG. 4.
Figure 6:
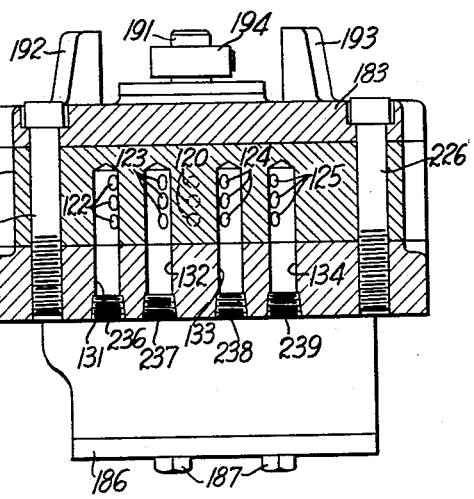
FIG. 6 is a section taken along the lines VI—VI in FIG. 5.
Figure 7:
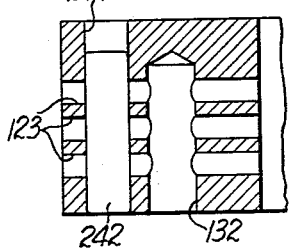
FIG. 7 is a section taken along the line VII—VII in FIG. 5.

Referring to FIGS. 5, 6 and 7, the rotatable valve member 108 is shown held in a neutral position by a spring biased detent mechanism 216 and in this position port 120 is blocked by the interior face of bore 118. The chambers 116, and 117 are joined by indentations 221 and 222 extending therebetween on top and bottom sides, respectively, of the flanged portion 223 of the valve member 108 which carries a plurality of notches 224 engageable by the resilient detent 216. The top section 183, intermediate section 184 and lower section 185 are held together by a plurality of cap screws 226 and 227. The three cap screws 227 are slightly smaller in diameter than cap screws 226. The clutch supply passages 122, 123, 124, 125, as illustrated, are four series of holes drilled in intermediate housing section 184 in radial relation to the bore 118. These passages 122, 123, 124, 125 intersect passages 131, 132, 133, 134 drilled in housing sections 185 and 184 parallel to the axis 241 of the rotatable valve member 108. Referring to FIGS. 5 and 7, a series of pins 242 are pressed into holes 243, 244, 245, 246 drilled in intermediate housing section 184 in intersecting relation to the passages 122, 123, 124, 125, thus blocking the latter passages intermediate the exterior of the housing and cross passages 131, 132, 133, 134. The clutch supply conduits 126, 127, 128, 129 are connected respectively to the threaded portions 236, 237, 238, 239 of bores 131, 132, 133, 134 respectively.

From the foregoing description it is evident that applicant has provided an extremely novel pressure fluid control including a valve housing having high, intermediate and low pressure chambers maintained at first, second and third predetermined values by three pressure control valves 111, 114, 121 and including a valve member associated with two of the chambers for selectively placing opposite sides of a double acting fluid actuated device in fluid communication with such chambers, respectively.

As illustrated, the actuated device is a double acting actuator for a pair of friction clutches and the nonactuated side of the double acting actuator 53 is placed in communication with the low pressure chamber 208 of the valve housing and the actuated side in communication with the 150 p.s.i. pressure of chamber 197. The other pressure chamber 202 of the valve housing may be utilized for auxiliary purposes such as for supplying a torque converter as illustrated in FIG. 1. The control valve illustrated in the drawings has particular application as a control mechanism for a power train including a change speed transmission of the type employing hydraulically actuated friction clutches and a torque converter.

Although a single embodiment of this invention has been illustrated, modifications will be evident to those familiar with the art to which this invention pertains and it should be understood that such modifications are within the scope of invention as are embraced by the scope of the appended claims.

What is claimed is:

1. A control valve assembly comprising: a valve housing having high, intermediate and low pressure chambers connected in series; an inlet passage in said housing communicating with said high pressure chamber; an outlet passage in said housing; a pressure control valve in said housing permitting fluid flow from said high pressure chamber to said intermediate pressure chamber when the pressure in said high pressure chamber exceeds a first predetermined value; a bore in said housing; a pair of pressure fluid supply passages in said housing in fluid communication with said bore; a pressure control valve in said housing permitting fluid flow from said intermediate pressure chamber to said low pressure chamber when the pressure in said intermediate pressure chamber exceeds a second predetermined value lower than said first predetermined value; a pressure control valve in said housing permitting fluid flow from said low pressure chamber to said outlet passage when the pressure in said low pressure chamber exceeds a third predetermined value lower than said second predetermined value; a shiftable valve member in said bore having a first position of adjustment wherein said high pressure chamber is connected to one of said supply passages and said low pressure chamber is connected to the other of said supply passages and having a second position of adjustment wherein said high pressure chamber is connected to said other supply passage and said low pressure chamber is connected to said one supply passage; and a pressure fluid supply port in said housing connected to said intermediate chamber.

2. A hydraulic system for a torque converter and a transmission of the type having a pair of hydraulically actuated friction clutches, comprising: a source of pressure fluid; a fluid reservoir; a control valve housing having first, second and third fluid chambers, an inlet port interconnecting said source of pressure fluid and said first chamber, and a reservoir port in fluid communication with said reservoir; a first relief valve in said housing between said first and second chambers permitting fluid flow from said first chamber to said second chamber when the fluid pressure in said first chamber exceeds a first predetermined value; a second relief valve in said housing between said second and third chambers permitting fluid flow from said second chamber to said third chamber when the fluid pressure in said second chamber exceeds a second predetermined value; a third pressure relief valve in said housing between said third chamber and said reservoir port permitting fluid flow from said third chamber to said reservoir port when the fluid pressure in said third chamber exceeds a third predetermined value; passage means establishing fluid communication between said second chamber and said torque converter for supplying fluid to the latter; a pair of clutch supply passages in said housing having fluid communication with said clutches, respectively; and a shiftable valve member in said housing having first and second positions of adjustment, said valve member in its first position of adjustment placing one of said clutch supply passages in fluid communication with said first chamber and placing the other of said clutch supply passages in fluid communication with said third chamber, said valve member in its second position of adjustment placing said other clutch supply passages in fluid communication with said first chamber and placing said one clutch supply passage in fluid communication with said third chamber, said second value being less than said first value and said third value being less than said second value.

References Cited in the file of this patent

UNITED STATES PATENTS

| | | |
|---|---|---|
| 2,619,848 | Carnagua | Dec. 2, 1952 |
| 2,633,760 | Kelley | Apr. 7, 1953 |
| 2,786,368 | Cook | Mar. 26, 1957 |
| 2,979,963 | Snoy | Apr. 18, 1961 |
| 3,040,852 | Svenson | June 26, 1962 |